(12) United States Patent
Durst

(10) Patent No.: US 8,794,879 B2
(45) Date of Patent: Aug. 5, 2014

(54) TOOL FOR MACHINING WORKPIECES

(75) Inventor: Gabriele Durst, Gärtringen (DE)

(73) Assignee: Komet Group GmbH, Stuttgart (DE)

( * ) Notice: Subject to any disclaimer, the term of this patent is extended or adjusted under 35 U.S.C. 154(b) by 171 days.

(21) Appl. No.: 13/378,439

(22) PCT Filed: Jun. 15, 2010

(86) PCT No.: PCT/EP2010/003582
§ 371 (c)(1),
(2), (4) Date: Dec. 15, 2011

(87) PCT Pub. No.: WO2010/145801
PCT Pub. Date: Dec. 23, 2010

(65) Prior Publication Data
US 2012/0093592 A1 Apr. 19, 2012

(30) Foreign Application Priority Data
Jun. 16, 2009 (DE) .......................... 10 2009 029 715

(51) Int. Cl.
*B23C 5/16* (2006.01)
*B23B 51/00* (2006.01)
*B23G 7/02* (2006.01)
*B23C 5/10* (2006.01)
*B23G 5/18* (2006.01)

(52) U.S. Cl.
CPC .............. *B23G 7/02* (2013.01); *B23G 2240/12* (2013.01); *B23B 51/00* (2013.01); *B23G 2225/28* (2013.01); *B23C 5/10* (2013.01); *B23G 5/18* (2013.01); *B23B 2228/56* (2013.01)
USPC .............. 407/119; 408/144; 428/547; 407/11

(58) Field of Classification Search
CPC .................................. B23B 51/00; B23C 5/16
USPC ............ 407/113, 118, 119; 408/144; 428/547
See application file for complete search history.

(56) References Cited

U.S. PATENT DOCUMENTS 4,146,080 A   3/1979  Baum
4,881,431 A * 11/1989 Bieneck ...................... 76/108.6

(Continued)

FOREIGN PATENT DOCUMENTS

DE      83 03 470 U1    9/1983
DE  10 2004 038 254 A1  3/2006

(Continued)

*Primary Examiner* — Andrea Wellington
*Assistant Examiner* — Sara Addisu
(74) *Attorney, Agent, or Firm* — Gudrun E. Huckett

(57) ABSTRACT

The tool has a clamping part (2) and a working part (11). It consists of a wear-resistant material, which contains tungsten carbide which has a grain size that lies in the range between approximately 0.2 and approximately 0.5 μm. The clamping part (2) consists of a tough material, which likewise contains tungsten carbide which has a grain size in the range between approximately 0.8 and approximately 1.3 μm. In a transitional region (11) between the working part (11) and the clamping part (2), the proportion of wear-resistant tungsten carbide decreases in the direction of the clamping part (2) to 0 and the proportion of tough tungsten carbide decreases in the direction of the working part (11) to 0. The mixing ratio between wear-resistant and tough tungsten carbide changes approximately steadily in the transitional region (10).

11 Claims, 11 Drawing Sheets

(56) References Cited

U.S. PATENT DOCUMENTS

| | | | |
|---|---|---|---|
| 4,906,528 A | | 3/1990 | Cerceau et al. |
| 5,186,739 A | * | 2/1993 | Isobe et al. .................. 75/238 |
| 6,511,265 B1 | | 1/2003 | Mirchandani et al. |
| 8,272,816 B2 | * | 9/2012 | Mirchandani ................ 408/144 |
| 2003/0118413 A1 | | 6/2003 | Bruhn et al. |
| 2006/0286410 A1 | * | 12/2006 | Ahlgren et al. .............. 428/698 |
| 2009/0136305 A1 | * | 5/2009 | Takiguchi ...................... 408/82 |
| 2012/0282051 A1 | * | 11/2012 | Mirchandani ................ 407/119 |

FOREIGN PATENT DOCUMENTS

| | | | |
|---|---|---|---|
| EP | 0 168 953 A1 | | 1/1986 |
| EP | 288775 A | * | 11/1988 |
| EP | 0 417 302 B1 | | 3/1991 |
| JP | 11221708 A | * | 8/1999 |
| JP | 2000 043006 A | | 2/2000 |
| JP | 2013188853 A | * | 9/2013 |
| WO | 03/010350 A1 | | 2/2003 |
| WO | 2007/001870 A2 | | 1/2007 |
| WO | 2009/037094 A1 | | 3/2009 |

* cited by examiner

TOOL FOR MACHINING WORKPIECES

BACKGROUND OF THE INVENTION

The invention concerns a tool for machining workpieces, the tool comprising a clamping part and a working part that are comprised at least partially of a wear-resistant material and of a tough material, wherein both materials contain tungsten carbide.

In known tools of this kind, the working part and a clamping part are made of the same materials, i.e., a tough core material and a hard wear-resistant outer jacket. The manufacture of such workpieces is complex and expensive. Moreover, the different materials are used also at locations where they are not even required.

The invention has the object to configure such a tool in such a way that it can be configured in a simple and inexpensive way while it provides ing high wear resistance of the working part and satisfactory elasticity of the clamping part.

SUMMARY OF THE INVENTION

This object is solved for a tool of the aforementioned kind in accordance with the invention in that the working part is comprised of the wear-resistant material whose tungsten carbide has a grain size that is in the range between approximately 0.2 μm to approximately 0.5 μm; in that the tungsten carbide in the clamping part has a grain size in the range between approximately 0.8 μm to approximately 1.3 μm; in that in a transition region between the working part and the clamping part the proportion of the wear-resistant tungsten carbide in the direction toward the clamping part decreases to 0 and the proportion of the tough tungsten carbide in the direction toward the working part decreases to 0; and in that the mixing ratio between wear-resistant tungsten carbide and tough tungsten carbide in the transition region changes approximately steadily.

Because of the configuration in accordance with the invention, the working part is comprised of the wear-resistant material whose tungsten carbide has a grain size that is in the range between approximately 0.2 to approximately 0.5 μm. The clamping part of the tool according to the invention is comprised of the tough material with tungsten carbide that has a grain size in the range between approximately 0.8 to approximately 1.3 μm. The working part and the clamping part are passing into each other by a transition region that has an appropriate axial length and in which the mixing ratio between wear-resistant tungsten carbide and tough tungsten carbide changes approximately steadily. For example, the proportion of the wear-resistant tungsten carbide decreases in the direction toward the clamping part to 0 while the proportion of the tough tungsten carbide of the clamping part decreases in the direction toward the working part to 0. This transition region between the working part and the clamping part is of great importance in particular with respect to the radial load capacity of the composite material. The transition region is designed such that a gradual transition from the wear-resistant material to the tough material takes place. In this connection, in the transition region both material kinds are present wherein the proportion of the wear-resistant material of the working part in the direction toward the clamping part decreases gradually until it has the value 0 in the clamping part. In reverse, in the transition region approximately a steady decrease of the proportion of tough material from the clamping part in the direction toward the working part takes place where the proportion of this tough material is then 0. In the tool according to the invention, the formation of the transition region is thus affected in a targeted fashion so that, depending on the tool, different properties of the transition region can be adjusted in a targeted fashion.

Further features of the invention result from the further claims, the description, and the drawings.

BRIEF DESCRIPTION OF THE DRAWINGS

The invention will be explained in more detail in the following with the aid of several embodiments illustrated in the drawings. It is shown in:

FIG. 1 to

FIG. 8 to

DESCRIPTION OF PREFERRED EMBODIMENTS

Figure 1:
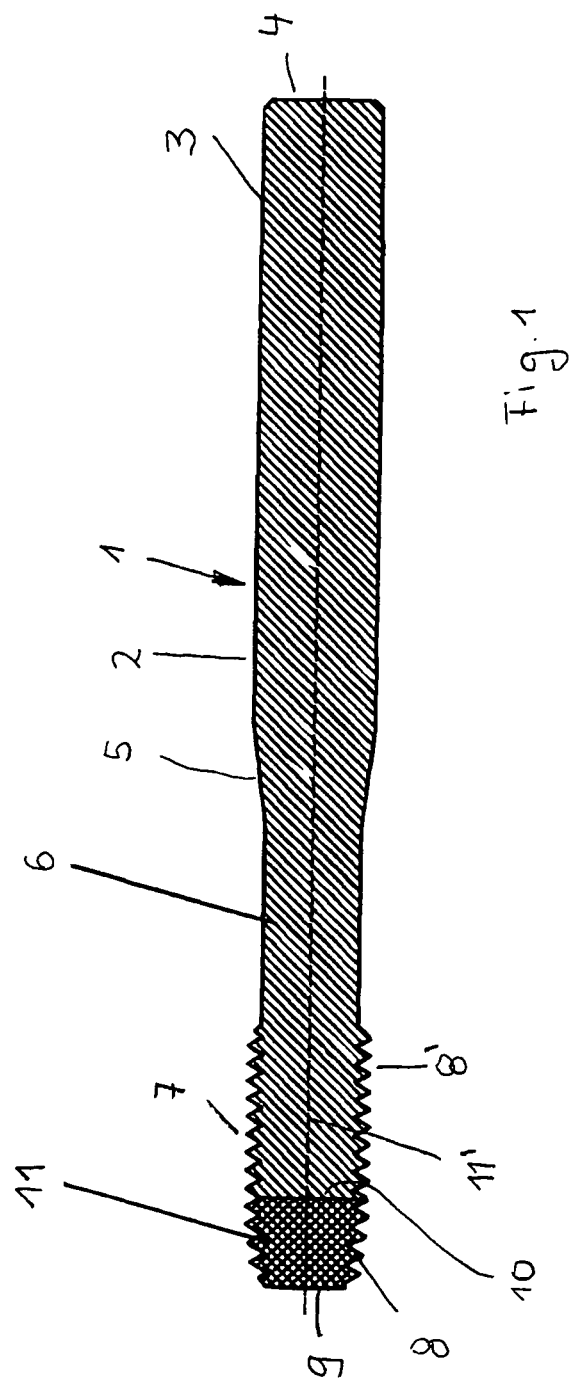
Figure 2:
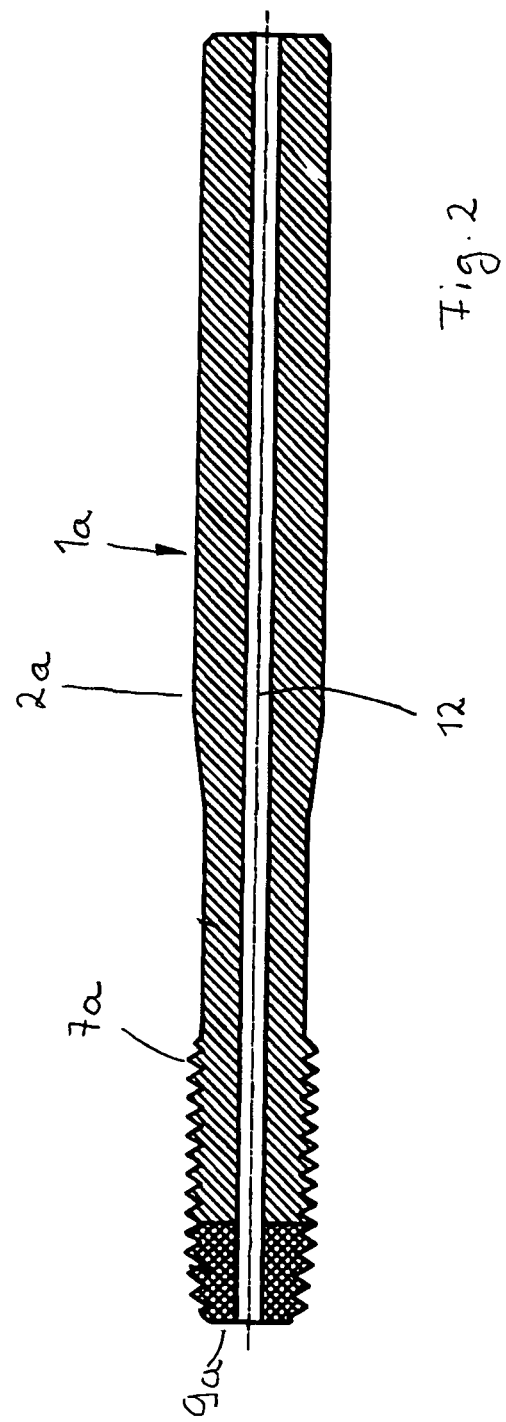
Figure 3:
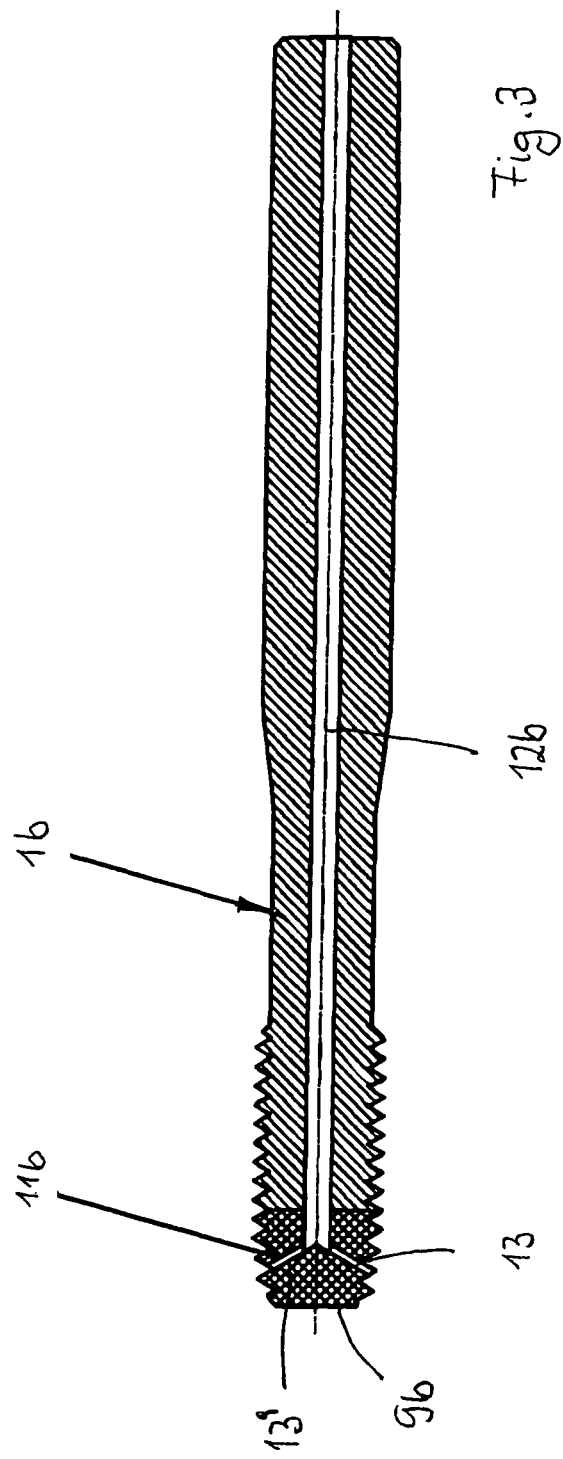
FIG. 3 in axial section different embodiments of a tool, respectively, that is embodied according to the invention as a former with a working part and a clamping part.

The tools illustrated in FIGS. 1 to 3 are thread formers that serve for manufacturing inner threads without cutting.

The thread former 1 according to FIG. 1 has a clamping part 2 that has a cylindrical shaft 3 with which it can be clamped in a tool receptacle. At the shaft end 4, the shaft 3 can be provided with a profiling (not illustrated) to provide an anti-rotation clamping action. The shaft 3 extends across somewhat more than half the tool length in the embodiment and passes by means of a conically tapering intermediate section 5 into a preferably cylindrical neck section 6 of the clamping part 2. The neck section 6 connects the intermediate section 5 with a working part 7. It has a first cut section 11 and a guide section 11'. The first cut section 11 has cutting edges 8 whose diameter increases in the direction of the guide section 11' that has cutting edges 8' with constant diameter. The end face 9 of the first cut section 11 is planar and extends perpendicularly to the longitudinal axis of the thread former 1.

The clamping part 2 with the shaft 3, the intermediate section 5, the neck section 6, and the guide section 11' is comprised of a tough material that is tungsten carbide with a cobalt contents of approximately 15% by weight. The first cut section 11, on the other hand, is comprised of the wear-resistant tungsten carbide with reduced cobalt contents.

Figure 7:
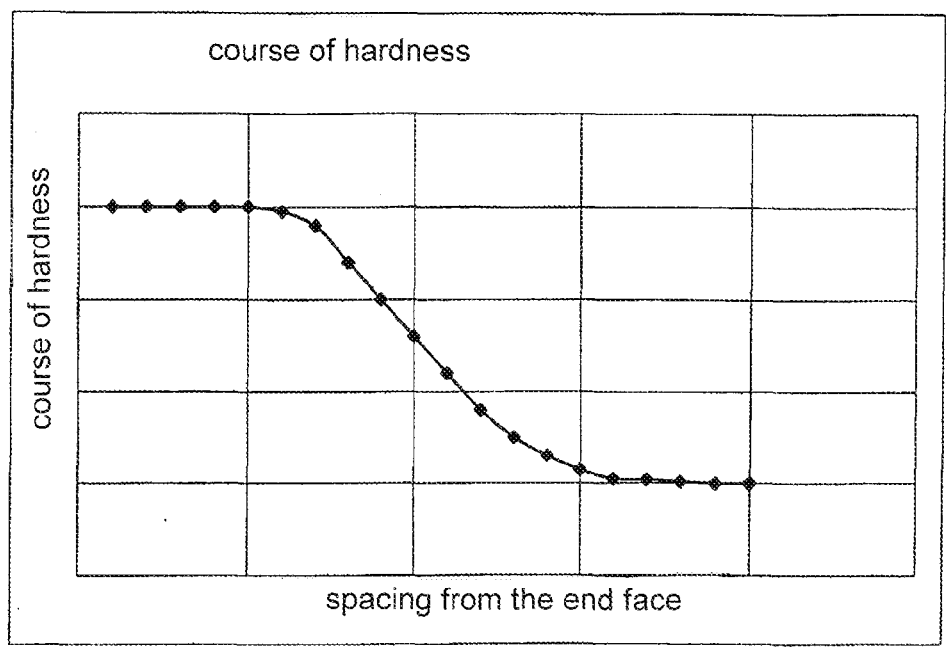
FIG. 7 in a diagram the course of hardness of a tool according to the invention in a transition region between a first cut section and a guide section.

The tool 1 is produced of the two materials by a sintering process. During the sintering process, a diffusion of sorts occurs at the transition between the two material kinds, indicated in FIG. 1 by line 10. This is expressed in that the hardness of the tool at the transition from the first cut section 11 to the guide section 11' decreases steadily. FIG. 7 shows the course of hardness as a function of the spacing from the end face 9. It can be seen that the first cut section 11 as a result of the wear-resistant material has a significantly greater hardness than the guide section 11' and the remaining portion of the tool 11.

Also, the transition region 10, as a result of the diffusion processes, is characterized by a decreasing concentration of one material and an increasing concentration of the other material; based on FIG. 11, this will be disclosed in detail in the following.

The described embodiment of the tool 1 in the transition region 10 ensures that even in case of strong heating of the tool during its use no stress peaks occur in the transition region as a result of different materials, which stress peaks might cause damage of the tool 1.

The cutting edges 8' of the guide section 11' can be provided with a diameter that decreases in the direction toward the clamping part 2 instead of with a diameter that stays the same. Since the tool 1 performs only a guiding function with the guide section 11', it is not disadvantageous that it is not comprised of wear-resistant material but of tough material.

The tool 1a according to FIG. 2 differs from the tool 1 only in that it has a central longitudinal passage 12 that extends across the entire length of the tool 1a, i.e., across its clamping part 2a and its working part 7a. The longitudinal passage 12 serves for supplying cooling medium during the machining step and opens at the end face 9a.

In the tool 1b according to FIG. 3 the longitudinal passage 12b does not open at the end face 9b. Cooling bore openings, in the following referred to as transverse passages 13, 13', branch away from the end of the longitudinal passage 12b and extend at an arbitrary exit angle in the direction toward the end face 9b and open at the exterior side of the first cut section 11b. In other respects, the tool 1b is of identical configuration compared to the tool 1a according to FIG. 2.

Figure 8:
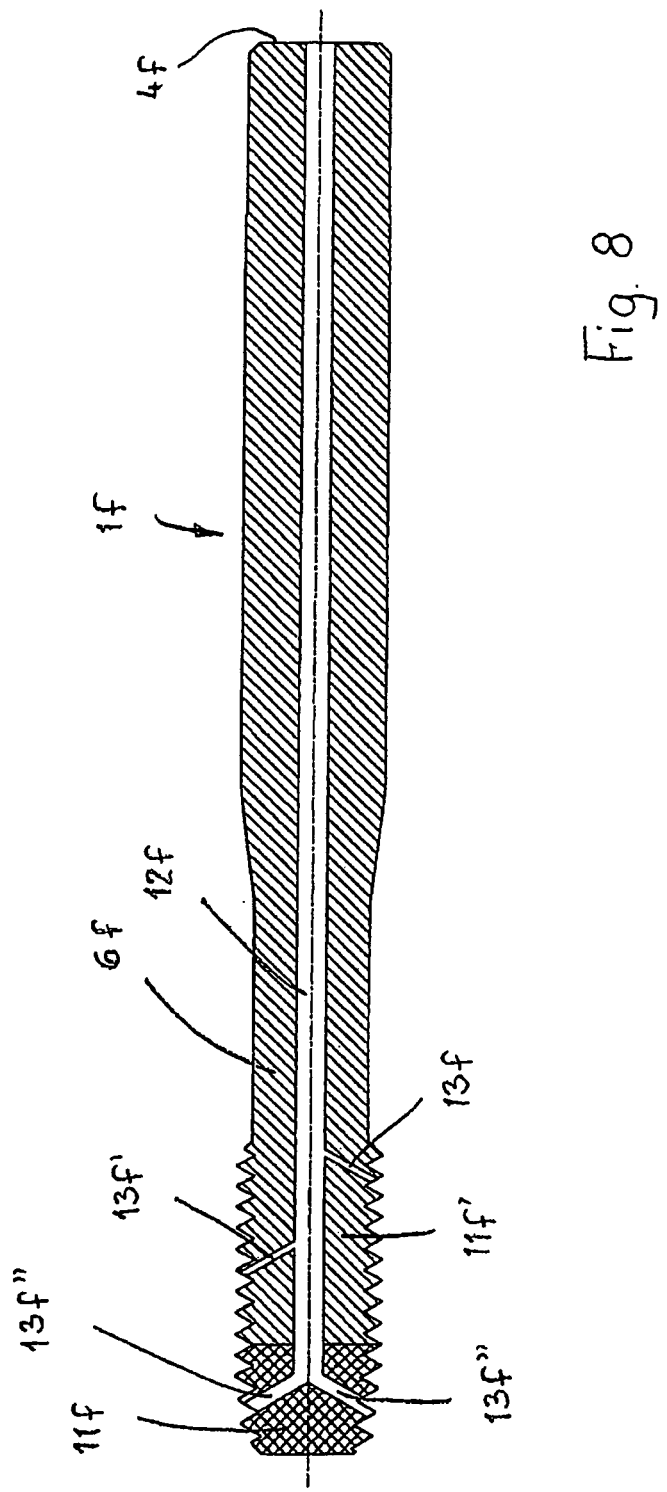

The tool 1f according to FIG. 8 has, similar to the embodiment according to FIG. 3, a central longitudinal passage 12f that extends axially from the shaft end 4f centrally into the first cut section 11f. The transverse passages 13f, 13f', 13f'' branch away from the central longitudinal passage 12f. These transverse passages are positioned in different areas of the tool. The transverse passage 13f is positioned at the level of the guide section 11f near the transition to the neck section 6f. The transverse passage 13f' is positioned at an axial spacing relative to the transverse passage 13f and opens also at the exterior side of the guide section 11f. The transverse passages 13f, 13f' have advantageously the same diameter. The transverse passages 13f'', on the other hand, are located in the first cut section 11f and have advantageously a greater cross-section than the transverse passages 13f, 13f'.

Because of the transverse passages 13f, 13f', 13f'' arranged at different levels it is possible to supply cooling medium in the required quantity in a targeted fashion. For example, in the cutting area, i.e., in the area of the first cut section 11f, more cooling lubricant is required than in the area of the guide section 11f. As shown in an exemplary fashion in FIG. 8, the transverse passages 13f'' are therefore provided with a greater cross-section than the transverse passages 13f, 13f'.

Moreover, the transverse passages 13f, 13f', 13f'' can be provided in different distribution so that the supply of cooling lubricant can also be matched to the respective requirements in this way.

Figure 9:
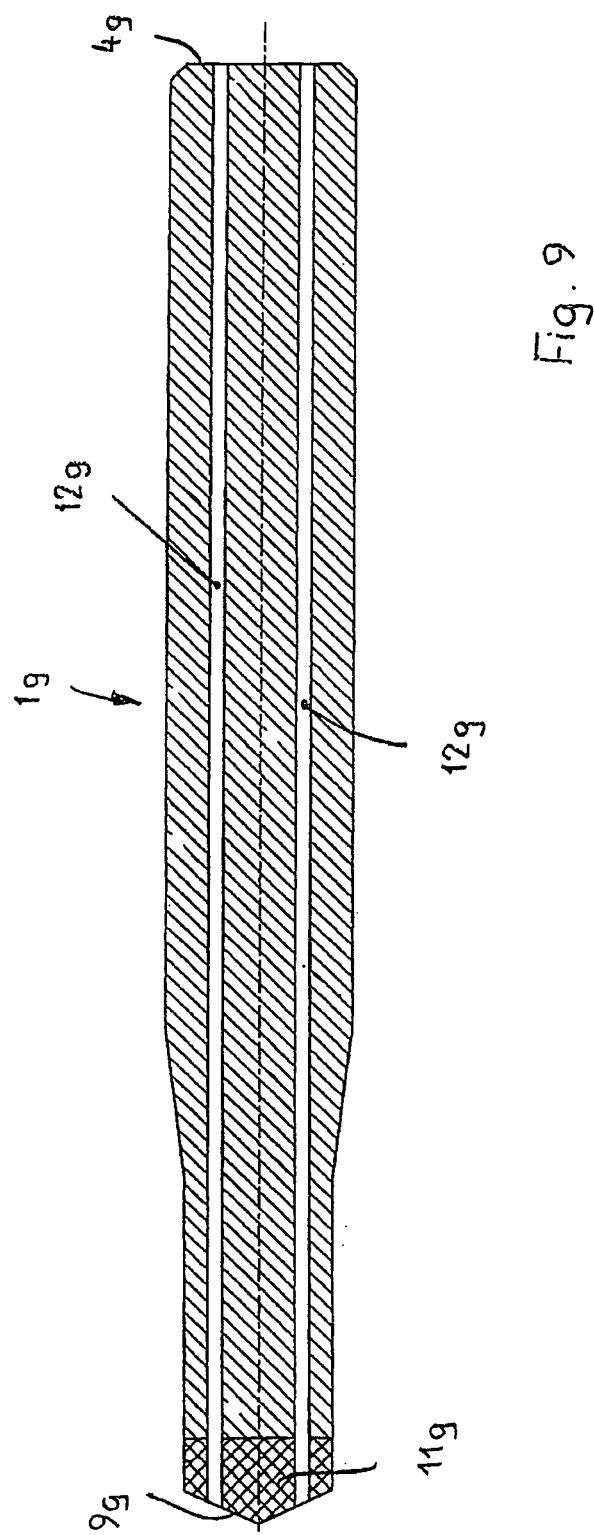

The tool 1g according to FIG. 9 has two longitudinal passages 12g that extend from the shaft end 4g axis-parallel across the entire length of the tool and, in accordance with the embodiment of FIG. 2, open at the end face 9g of the first cut section 11g. The two longitudinal passages 12g extend preferably parallel to each other and are positioned off-center within the tool 1g. The off-center longitudinal passages 12g are advantageously arranged in the area of flanks (not illustrated) that separate neighboring cutting grooves of the tool 1g from each other. The number of longitudinal passages 12g corresponds advantageously to the number of cutting grooves of the tool 1g. The off-center longitudinal passages can also be arranged at different spacings relative to the center of the tool and can be arranged from a center-near position to a position that is more remote from the center.

Figure 10:
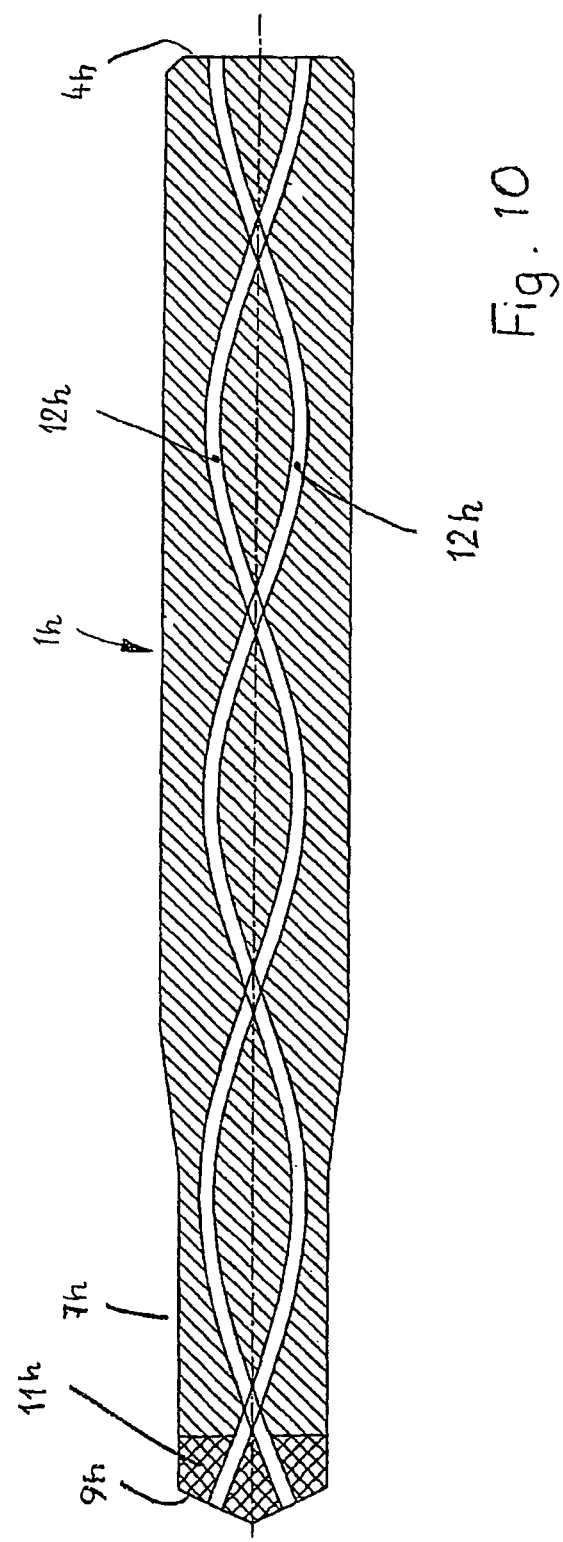
FIG. 10 in an illustration according to FIG. 1 further embodiments of tools according to the invention, respectively.

The tool 1h according to FIG. 10 has longitudinal passages 12h that extend from the shaft end 4h to the end face 9h of the first cut section 11h. The longitudinal passages 12h extend in a coil shape across the length of the workpiece 1h. This coil-shaped configuration of the longitudinal passages 12h is used in case of tools having a coil-shaped working part 7h, i.e., provided with coil-shaped cutting grooves and intermediately positioned cutting edges that extend in a coil shape. In this case, the number of longitudinal passages 12h also corresponds advantageously to the number of cutting grooves.

Figure 4:
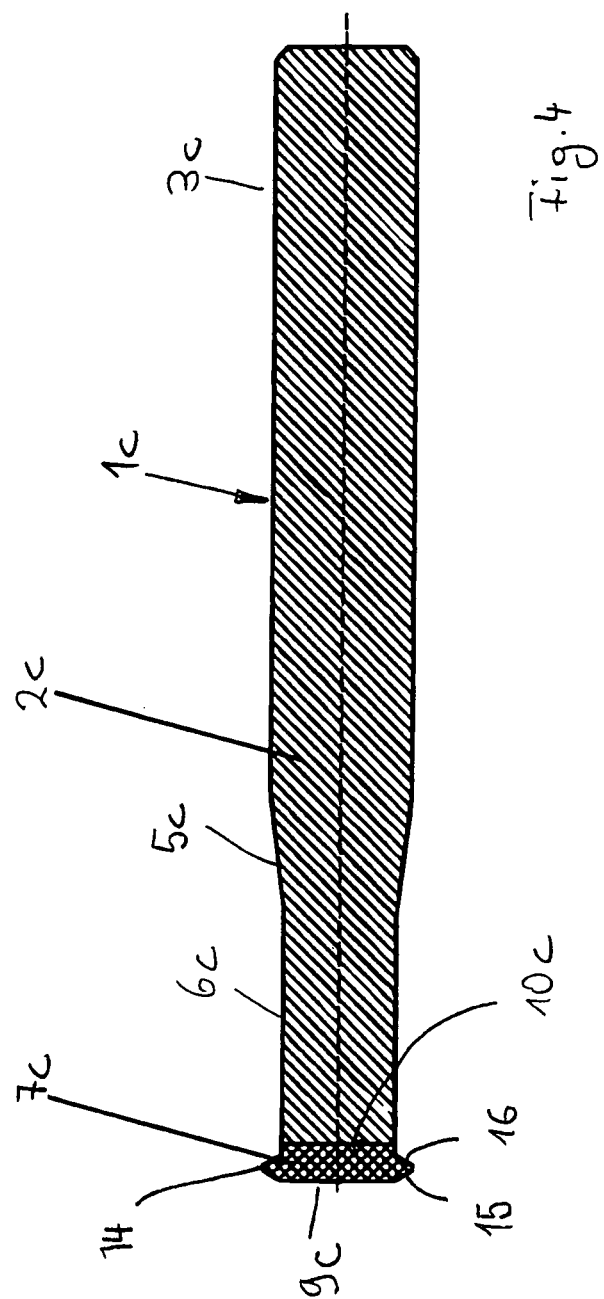
FIG. 4.
Figure 5:
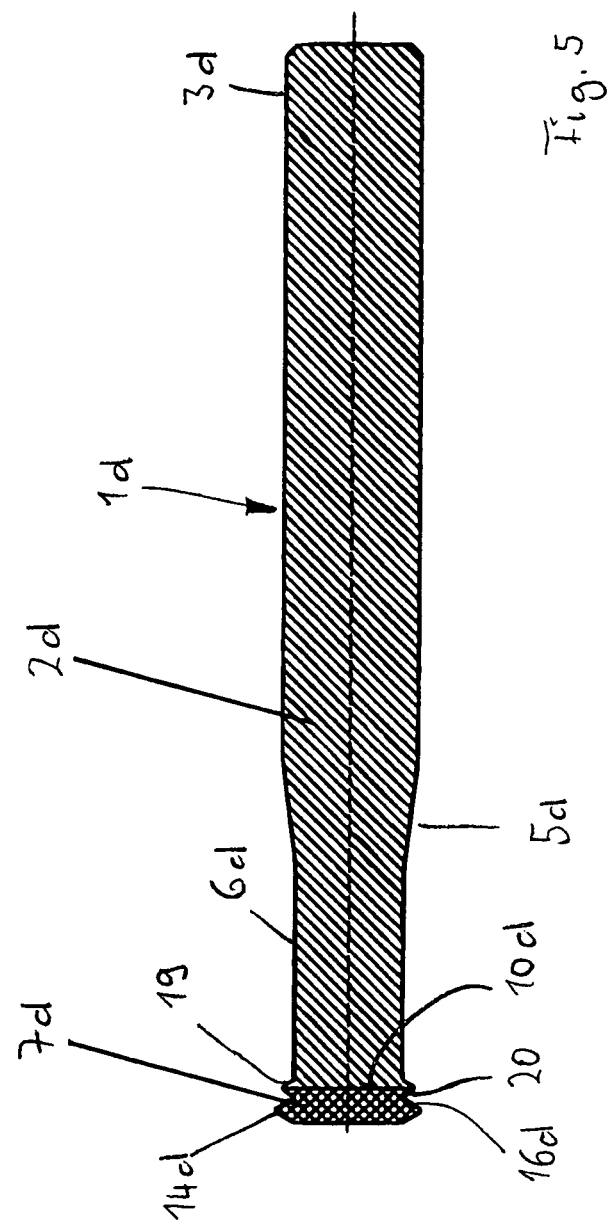
FIG. 5 another tool, respectively, embodied in accordance with the invention as a milling tool in an illustration according to FIG. 1.

FIGS. 4 and 5 show thread milling tools or profile milling tools with a division that is located within the wear-resistant material.

The tool 1c according to FIG. 4 has, like the afore described tools, clamping part 2c and working part 7c. The working part 7c is comprised also of wear-resistant material while the clamping part 2c is produced of tough material. The clamping part 2c has the clamping shaft 3c, the intermediate section 5c, and the neck section 6c that extends to the working part 7c. The working part 7c has a circumferentially extending cutting tooth 14 that is positioned in a radial plane. Its leading tooth flank 15 adjoins the planar end face 9c while the rearward tooth flank 16 adjoins the neck section 6c.

As indicated by the line 10c, the transition region from the tough material to the wear-resistant material is within the region of the neck section 6c. As in the thread formers according to FIGS. 1 to 3, the transition between the two different materials is realized across an axial area, as explained in connection with FIG. 7. In this way, it is ensured that even for high transverse loads there is no risk that the working part 7c will be sheared off the clamping part 2c or the working part 7c will break off.

This tool 1c is a thread milling tool that is used particularly for hard machining and for processing of materials that are difficult to cut. It can be used advantageously as a micro milling tool or for great thread depth, for example, when the length/diameter ratio surpasses a value of approximately 3. During thread milling, the tough material prevents breakage caused by the resulting bending moment. The wear-resistant working part 7c is decisive for the service life of the tool 1c.

The milling tool 1d according to FIG. 5 is substantially identical to the embodiment of FIG. 4. Only the working part 7d has, aside from the cutting tooth 14d, a second cutting tooth 19 positioned in a radial plane. It has a smaller diameter than the cutting tooth 14d. The leading tooth flank 20 of the cutting tooth 19 adjoins the rearward tooth flank 16d of the cutting tooth 14d. The transition region (line 10d) between the tough material and the wear-resistant material is located in an enlarged region of the tool 1d. In the embodiment, this transition is at the level of the cutting tooth 19.

Figure 6:
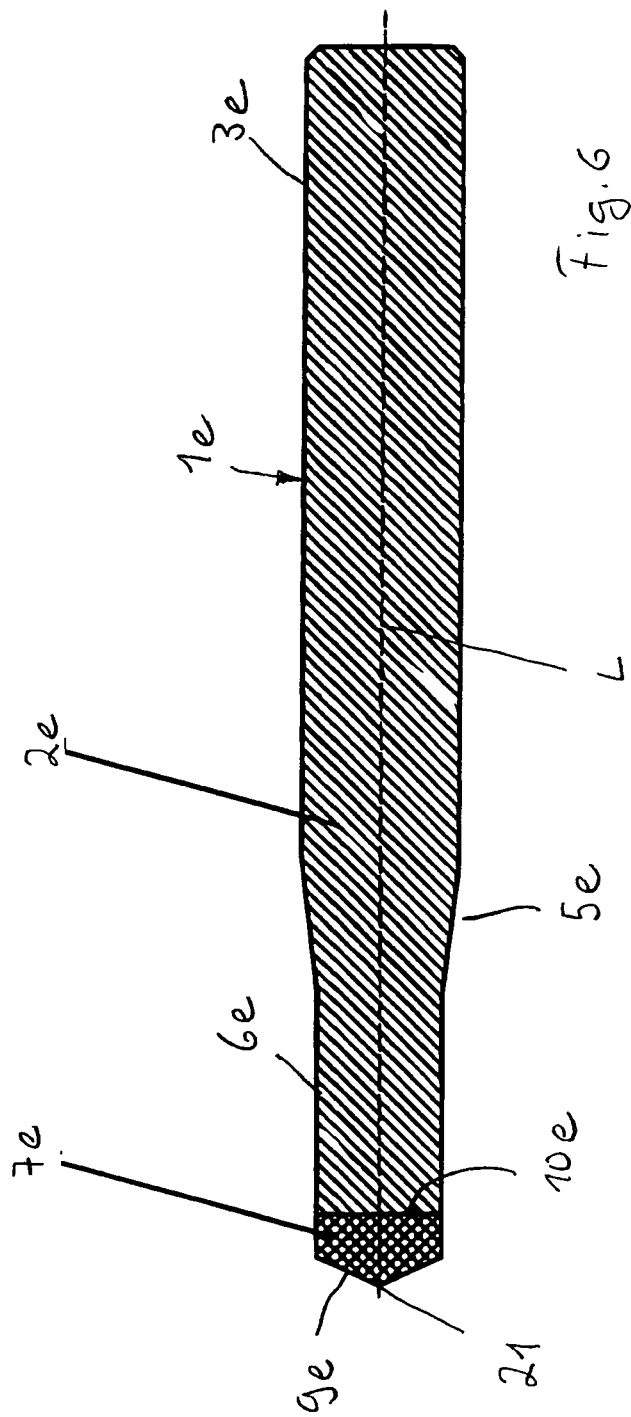
FIG. 6 an illustration in accordance with FIG. 1 with a tool according to the invention that is embodied as a drill bit.

The clamping part 2d, like the thread former according to FIGS. 1 to 3, has the shaft 3d, the intermediate section 5d, and the neck section 6d. The course of hardness across the length of the tool 1d corresponds to the course in the preceding tools (FIG. 7). The tool 1e according to FIG. 6 is embodied as a drill bit whose clamping part 2e is embodied identically compared to the clamping parts 2c and 2d of the tools according to FIGS. 4 and 5. The working part 7e is comprised of the wear-resistant material and has a drill tip 21 that is positioned on the longitudinal axis L of the tool 1e. The clamping part 2e is comprised also of the shaft 3e, the intermediate section 5e, and the neck section 6e. The transition (line 10e) between the tough Material and the wear-resistant material is realized across an axial length as will be explained with the aid of FIGS. 1 and 7. The drill bit 1e is suitable especially for producing deep bores. The drill bit 1e can be used as a drill bit of solid carbide metal with small diameter of, for example, less than 1 mm because, as a result of the described configuration with the working part 7e of wear-resistant material and its monolithic configuration with the clamping part 2e of tough material, a high wear resistance and a proper absorption of bending forces are ensured.

Of course, the tools described in FIGS. 1 to 6 can have any other dimensions and cross-sectional shapes. It is important that the working part is comprised of wear-resistant material and the clamping part of tough material.

All described tools 1, 1a to 1e have in the transition region 10 a course of hardness as illustrated in FIG. 7. The transition between the wear-resistant material and the tough material is realized by an axial region in which the concentration of the hard material decreases while the concentration of the tough material increases so that there is no risk of shearing or breaking of the working part, even when the length/diameter ratio is great, for example, greater than approximately 3.

The transition region that is formed in the separating plane 10, 10c to 10e between the hard material and the wear-resistant material of the working part and the tough, break-resistant material of the clamping part is especially important with regard to the radial load capacity of the composite material. The two different materials are carbide metals in the form of tungsten carbide, as described. A good mixing of the different grain size proportions of the two carbide metal areas in the diffusion zone ensures a continuous transition of the properties of the two different carbide metal materials. Accordingly, the wear resistance increases in the direction toward the tool tip and the toughness decreases. This change is not realized in an abrupt jump but with a continuous transition. This continuous transition causes a maximum radial load capability of the composite material. The expansion of this transition region in the axial direction of the tool can be affected by a suitable selection of the parameters time and temperature during sintering of the composite material.

The sintering process is realized in a temperature range between approximately 1,400 and 1,550° C. The residence time for sintering is between approximately 0.5 1.5 hours, depending on the size of the blank and its composition.

The cobalt that is used in both of the different materials forms the binding agent for the tungsten carbide particles and is existing in liquid form during sintering. The carbide metal material that is used for the working part, on the one hand, and for the clamping part, on the other hand, exists in powder form. The liquid cobalt diffuses at the boundary surface of these two different carbide metal powders. Cobalt, including all additives dissolved therein, is capable of strong diffusion movements. In particular, the diameters of small hard material grains are included in the diffusion processes. The hard material grains with larger diameters are less affected by these diffusion movements. By varying the sintering temperature, the diffusion processes, i.e., the diffusion travel, can be affected in a targeted fashion. The course of the hardness in the transition region (FIG. 7) illustrates the changing microstructure properties in the transition region.

The composition of the composite carbide metal is characterized by a different cobalt contents in the area of the working part and the clamping part as well as by different grain size of the tungsten carbide grains.

The cobalt contents in the area of the working part is between approximately 8 and 12% by weight and in the area of the clamping part between approximately 12 and 16% by weight. The grain size of the tungsten carbide parts in the area of the working part is approximately 0.2 to approximately 0.5 μm, i.e., in the ultrafine range, and in the area of the clamping part is approximately 0.8 to approximately 1.3 μm, i.e. in the fine range. Of course, a few grains in the area of the clamping part can also have a larger diameter.

Figure 11:
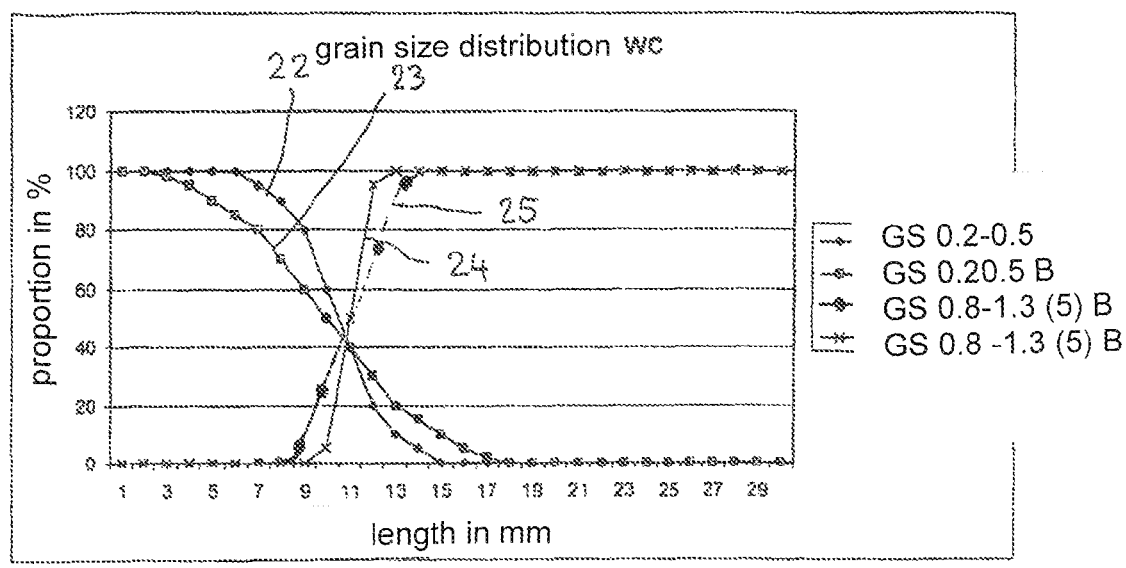
FIG. 11 in a diagram the course of the grain size distribution of tungsten carbide across the length of the tool.

FIG. 11 shows the grain size distribution of tungsten carbide across the length of the tool.

The curve 22 shows the distribution of the tungsten carbide particles with a grain size diameter between 0.2 and 0.8 μm. In the area of the working part the tungsten carbide particles have a grain size that is in this range. In the transition zone, the proportion of tungsten carbide having this grain size decreases until tungsten carbide particles having such a grain diameter are no longer present. This transition region extends between approximately 6 mm and 15 mm in the example, i.e., across a length of approximately 9 mm.

The curve 23 results when the sintering temperature is higher than that of the curve 22. Here, the transition region extends in an exemplary fashion from approximately 2 mm to approximately 18 mm. This transition zone is thus significantly longer than in the curve 22. This shows that by a higher sintering temperature the transition region between the hard and wear-resistant carbide metal material and the tough, break-resistant carbide metal material can be significantly enlarged.

Furthermore, the diagram according to FIG. 11 shows that in the area of the working part of the tool the proportion of tungsten carbide with a grain size diameter of approximately 0.2 to approximately 0.5 μm is 100% while the proportion of tungsten carbide particles with a grain size diameter between approximately 0.8 to approximately 1.3 μm (curves 24 and 25) is approximately 0%.

The curve 24 shows that the change of the grain size distribution of tungsten carbide particles with grain size diameters between approximately 0.8 to approximately 1.3 μm is realized within a significantly smaller axial region than in case of tungsten carbide particles with small grain size diameter (curve 22 and 23). The curve 24 shows that the proportion of tungsten carbide particles of this grain size diameter range increases from 0% to 100% beginning at approximately 9 mm and ending at approximately 12 mm. The transition region extends thus only across a length of approximately 3 mm.

The curve 25 indicates the conditions when the sintering temperature is higher. The transition from 0% to 100% then begins at approximately 8 mm and ends at approximately 14 mm. Accordingly, the axial length of this transition region is approximately 5 mm. In case of these larger grain sizes it is also apparent that with higher sintering temperature the transition zone is enlarged as a result of the greater diffusion travel.

In comparison to the small grain sizes (curves 22 and 23), the concentration change of the greater grain sizes is realized across a significantly smaller axial area of the tool.

Similar conditions result when the residence time for sintering is varied. The longer the residence time for sintering, the larger the diffusion travel and the wider the adjustment range of the transition region between the two carbide metal materials.

In the described way, it is possible to adjust in a targeted fashion the axial width of the transition region by a targeted heat treatment. As illustrated by the embodiment of FIG. 11, the transition region may extend across a significant axial length. For the small grain sizes the axial length of the transition region can be, for example, 16 mm (curve 23).

What is claimed is:

1. A tool for processing workpieces, the tool comprising:
   a clamping part comprised of a tough material containing a first tungsten carbide and cobalt, wherein cobalt is a binder for the first tungsten carbide;
   a working part comprised of a wear-resistant material containing a second tungsten carbide and cobalt, wherein cobalt is a binder for the second tungsten carbide;
   a transition region connecting the clamping part and the working part;
   wherein the first tungsten carbide of the tough material has first tungsten carbide particles of a grain size in the range between approximately 0.8 μm to approximately 1.3 μm;
   wherein the second tungsten carbide of the wear-resistant material has second tungsten carbide particles of a grain size that is in the range between approximately 0.2 μm to approximately 0.5 μm;
   wherein in the transition region between the working part and the clamping part a proportion of the second tungsten carbide particles decreases to 0 in a direction toward the clamping part and a proportion of the first tungsten carbide particles decreases to 0 in a direction toward the working part; and
   wherein a mixing ratio of the first tungsten carbide and the second tungsten carbide in the transition region changes gradually and approximately steadily;
   wherein the decrease to 0 of the proportion of the first tungsten carbide particles beginning at the clamping part occurs across a first axial length of the tool and the decrease to 0 of the proportion of the second tungsten carbide particles beginning at the working part occurs across a second axial length of the tool, wherein the second axial length is longer than the first axial length.

2. The tool according to claim 1, wherein a hardness of the tool decreases across an axial region in the transition region from the wear-resistant material to the tough material.

3. The tool according to claim 1, wherein the tool has an area with an enlarged cross-section and wherein the transition region is provided within the area with the enlarged cross-section.

4. The tool according to claim 1, wherein, in the working part, cobalt in a range between approximately 8% by weight and approximately 12% by weight is admixed to the second tungsten carbide.

5. The tool according to claim 1, wherein, in the clamping part, cobalt in a range between approximately 12% and approximately 16% by weight is admixed to the first tungsten carbide.

6. The tool according to claim 1, wherein the tool is a thread former.

7. The tool according to claim 1, wherein the tool is a milling tool/thread milling tool.

8. The tool according to claim 1, wherein the tool is a drill bit.

9. The tool according to claim 1, comprising at least one cooling passage.

10. The tool according to claim 1, wherein the working part has approximately the same hardness across an axial length of the working part.

11. The tool according to claim 1, wherein the clamping part has substantially approximately the same hardness across an axial length of the clamping part.

\* \* \* \* \*